United States Patent
Huang et al.

(10) Patent No.: US 10,986,693 B2
(45) Date of Patent: Apr. 20, 2021

(54) APPARATUSES AND METHODS FOR PERFORMING A CELL MEASUREMENT

(71) Applicant: MEDIATEK INC., Hsin-Chu (TW)

(72) Inventors: Din-Hwa Huang, Hsin-Chu (TW); Wenze Qu, Beijing (CN); Yih-Shen Chen, Hsin-Chu (TW); Tsang-Wei Yu, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 30 days.

(21) Appl. No.: 16/240,963

(22) Filed: Jan. 7, 2019

(65) Prior Publication Data

US 2019/0215895 A1 Jul. 11, 2019

Related U.S. Application Data

(60) Provisional application No. 62/616,038, filed on Jan. 11, 2018.

(51) Int. Cl.
| | |
|---|---|
| *H04W 76/28* | (2018.01) |
| *H04W 24/10* | (2009.01) |
| *H04W 56/00* | (2009.01) |
| *H04W 76/27* | (2018.01) |

(52) U.S. Cl.
CPC .......... *H04W 76/28* (2018.02); *H04W 24/10* (2013.01); *H04W 56/0055* (2013.01); *H04W 76/27* (2018.02)

(58) Field of Classification Search
CPC . H04W 24/10; H04W 56/0055; H04W 76/27; H04W 76/28
See application file for complete search history.

(56) References Cited

U.S. PATENT DOCUMENTS

| | | | |
|---|---|---|---|
| 7,957,360 B2 | 6/2011 | Suzuki et al. | |
| 9,756,514 B2 * | 9/2017 | Kim | H04W 24/10 |
| 9,860,804 B2 | 1/2018 | Wu et al. | |
| 2010/0323683 A1 * | 12/2010 | Kazmi | H04W 24/02 |
| | | | 455/422.1 |
| 2012/0044822 A1 | 2/2012 | Kim et al. | |
| 2014/0003257 A1 * | 1/2014 | Chin | H04W 52/0261 |
| | | | 370/252 |
| 2014/0194125 A1 | 7/2014 | Wen et al. | |
| 2017/0026861 A1 | 1/2017 | Tseng et al. | |
| 2018/0049269 A1 * | 2/2018 | Fujishiro | H04W 76/28 |
| 2018/0262313 A1 * | 9/2018 | Nam | H04L 5/005 |
| 2020/0092938 A1 * | 3/2020 | Tang | H04W 76/28 |

FOREIGN PATENT DOCUMENTS

| | | |
|---|---|---|
| CN | 102638857 A | 8/2012 |
| CN | 102905286 A | 1/2013 |
| CN | 105706483 A | 6/2016 |
| WO | 2017/082799 A1 | 5/2017 |

* cited by examiner

*Primary Examiner* — Kevin C. Harper
*Assistant Examiner* — Derrick V Rose
(74) *Attorney, Agent, or Firm* — McClure, Qualey & Rodack, LLP

(57) ABSTRACT

A User Equipment (UE) including a wireless transceiver and a controller is provided. The wireless transceiver performs wireless transmission and reception to and from a service network. The controller receives a measurement configuration and a Discontinuous Reception (DRX) configuration from the service network via the wireless transceiver, extends a measurement period indicated by the measurement configuration, and performs a cell measurement via the wireless transceiver in the extended measurement period.

12 Claims, 5 Drawing Sheets

APPARATUSES AND METHODS FOR PERFORMING A CELL MEASUREMENT

CROSS REFERENCE TO RELATED APPLICATIONS

This Application claims priority of U.S. Provisional Application No. 62/616,038, filed on Jan. 11, 2018, the entirety of which is incorporated by reference herein.

BACKGROUND OF THE APPLICATION

Field of the Application

The application generally relates to wireless communications and, more particularly, to apparatuses and methods for performing a cell measurement.

Description of the Related Art

With the growing demand for ubiquitous computing and networking, various wireless technologies have been developed, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

These wireless technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

For a 5G NR User Equipment (UE), there are two kinds of operations which require the UE to frequently switch on and off the wireless transceiver. The operations include the Discontinuous Reception (DRX) operation and cell measurements for Radio Resource Management (RRM). Specifically, the cell measurements are configured via the Synchronization Signal Block (SSB)-based RRM Measurement Timing Configuration (SMTC). That is, the cell measurements are performed by measuring the signal quality of SSBs. Due to the fact that the SSBs are broadcast signals and the DRX configurations are UE specific, it is almost impossible to align the measurement occasions and the DRX ON occasions for each UE. As a result, the UE's power consumption may be severely increased by the non-alignment of the measurement occasions and the DRX ON occasions.

BRIEF SUMMARY OF THE APPLICATION

In order to solve the aforementioned problem, the present application proposes apparatuses and methods for performing a cell measurement wherein the measurement period indicated by the measurement configuration (e.g., the SMTC) received from the service network is extended by the UE, thereby allowing the UE to skip one or more measurement occasions during the extended measurement period. Advantageously, the UE's power consumption may be significantly reduced.

In one aspect of the application, a User Equipment (UE) comprising a wireless transceiver and a controller is provided. The wireless transceiver is configured to perform wireless transmission and reception to and from a service network. The controller is configured to receive a measurement configuration and a Discontinuous Reception (DRX) configuration from the service network via the wireless transceiver, extend a measurement period indicated by the measurement configuration, and perform a cell measurement via the wireless transceiver in the extended measurement period.

In another aspect of the application, a method for performing a cell measurement, executed by a UE comprising a wireless transceiver, is provided. The method comprises the steps of: receiving a measurement configuration and a DRX configuration from a service network via the wireless transceiver; extending a measurement period indicated by the measurement configuration; and performing the cell measurement via the wireless transceiver in the extended measurement period.

Other aspects and features of the present application will become apparent to those with ordinarily skill in the art upon review of the following descriptions of specific embodiments of the UEs and the methods for performing a cell measurement.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
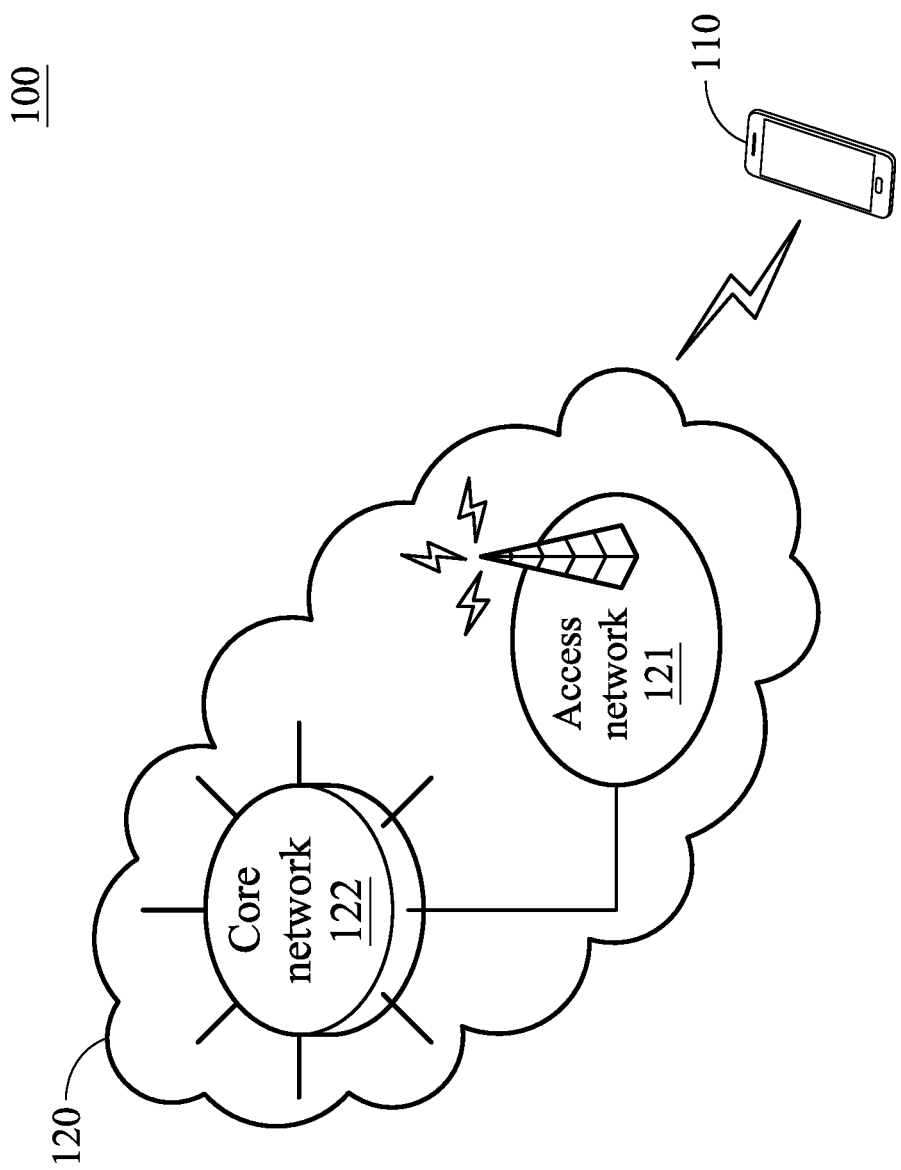
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 may include a User Equipment (UE) 110 and a service network 120, wherein the UE 110 may be wirelessly connected to the service network 120 for obtaining mobile services and performing cell measurements on the cell(s) of the service network 120.

The UE 110 may be a feature phone, a smartphone, a panel Personal Computer (PC), a laptop computer, or any wireless communication device supporting the wireless technology (e.g., the 5G NR technology) utilized by the service network 120. In another embodiment, the UE 110 may support more than one wireless technology. For example, the UE may support the 5G NR technology and a legacy 4G technology, such as the LTE/LTE-A/TD-LTE technology.

The service network 120 includes an access network 121 and a core network 122. The access network 121 is responsible for processing radio signals, terminating radio protocols, and connecting the UE 110 with the core network 122. The core network 122 is responsible for performing mobility management, network-side authentication, and interfaces with public/external networks (e.g., the Internet). Each of the access network 121 and the core network 122 may comprise one or more network nodes for carrying out said functions.

In one embodiment, the service network 120 may be a 5G NR network, and the access network 121 may be a Radio Access Network (RAN) and the core network 122 may be a Next Generation Core Network (NG-CN).

A RAN may include one or more cellular stations, such as next generation NodeBs (gNBs), which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

A 5G cellular station may form one or more cells with different Component Carriers (CCs) for providing mobile services to the UE 110. For example, the UE 110 may camp on one or more cells formed by one or more gNBs or TRPs, wherein the cells which the UE 110 is camped on may be referred to as serving cells, including a Primary cell (Pcell) and one or more Secondary cells (Scells).

A NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

In another embodiment, the service network 120 may be an LTE/LTE-A/TD-LTE network, and the access network 121 may be an Evolved-Universal Terrestrial Radio Access Network (E-UTRAN) and the core network 122 may be an Evolved Packet Core (EPC).

An E-UTRAN may include at least one cellular station, such as an evolved NodeB (eNB) (e.g., macro eNB, femto eNB, or pico eNB), each of which may form a cell for providing mobile services to the UE 110. For example, the UE 110 may camp on one or more cells formed by one or more eNBs, wherein the cells which the UE 110 is camped on may be referred to as serving cells, including a Pcell and one or more Scells.

An EPC may include a Home Subscriber Server (HSS), Mobility Management Entity (MME), Serving Gateway (S-GW), and Packet Data Network Gateway (PDN-GW or P-GW).

It should be understood that the wireless communication environment 100 described in the embodiment of FIG. 1 are for illustrative purposes only and are not intended to limit the scope of the application. For example, the wireless communication environment 100 may include both a 5G NR network and a legacy network (e.g., an LTE/LTE-A/TD-LTE network, or a WCDMA network), and the UE 110 may be wirelessly connected to both the 5G NR network and the legacy network.

Figure 2:
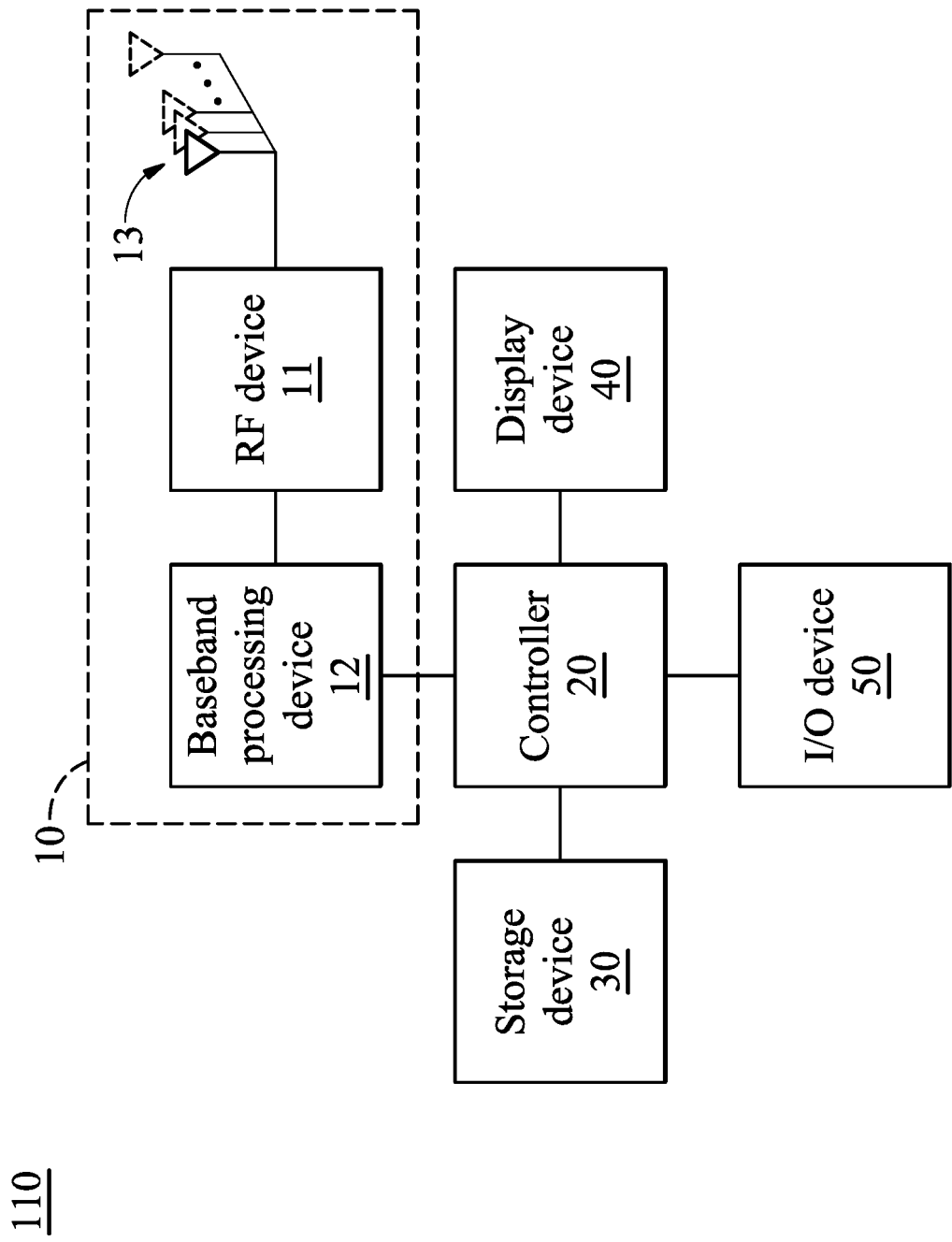
FIG. 2 is a block diagram illustrating the UE 110 according to an embodiment of the application.

FIG. 2 is a block diagram illustrating the UE 110 according to an embodiment of the application.

As shown in FIG. 2, the UE 110 may include a wireless transceiver 10, a controller 20, a storage device 30, a display device 40, and an Input/Output (I/O) device 50.

The wireless transceiver 10 is configured to perform wireless transmission and reception to and from the cells formed by one or more cellular stations of the access network 121. Specifically, the wireless transceiver 10 may include a Radio Frequency (RF) device 11, a baseband processing device 12, and antenna(s) 13, wherein the antenna(s) 13 may include one or more antennas for beamforming. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may comprise a mixer to multiply the baseband signals with a carrier oscillated in the radio frequency of the supported cellular technologies, wherein the radio frequency may be any radio frequency (e.g., 30 GHz-300 GHz for mmWave) utilized in the 5G NR technology, or may be 900 MHz, 2100 MHz, or 2.6 GHz utilized in LTE/LTE-A/TD-LTE technology, or another radio frequency, depending on the wireless technology in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the cells formed by cellular station of the access network 121, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method for performing a cell measurement.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., measurement configurations, DRX configurations, and/or measurement results), instructions, and/or program code of applications, communication protocols, and/or the method for performing a cell measurement.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MIMI) for interaction with users.

It should be understood that the components described in the embodiment of FIG. 2 are for illustrative purposes only and are not intended to limit the scope of the application. For example, the UE 110 may include more components, such as a power supply, and/or a Global Positioning System (GPS) device, wherein the power supply may be a mobile/replaceable battery providing power to all the other components of the UE 110, and the GPS device may provide the location information of the UE 110 for use by some location-based services or applications. Alternatively, the UE 110 may include fewer components. For example, the UE 110 may not include the display device 40 and/or the I/O device 50.

Figure 3:
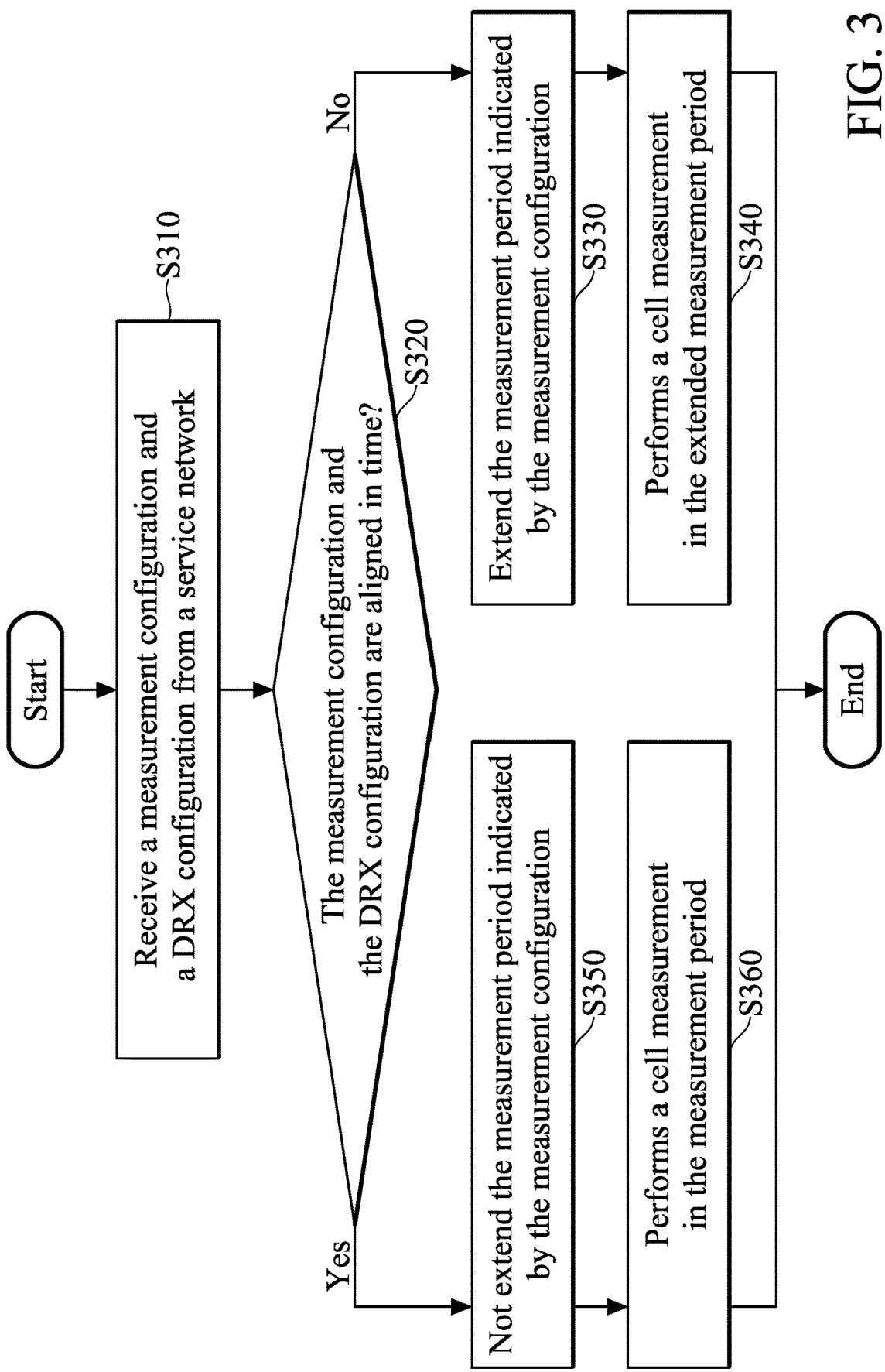
FIG. 3 is a flow chart illustrating the method for performing a cell measurement according to an embodiment of the application.

FIG. 3 is a flow chart illustrating the method for performing a cell measurement according to an embodiment of the application.

In this embodiment, the method for performing a cell measurement is executed by a UE (e.g., the UE 110) including a wireless transceiver (e.g., the wireless transceiver 10).

To begin with, the UE receive a measurement configuration and a Discontinuous Reception (DRX) configuration from a service network via the wireless transceiver (step S310).

Specifically, the measurement configuration and the DRX configuration may be included in a Radio Resource Control (RRC) message (e.g., an RRC Connection Setup message, or an RRC Connection Reconfiguration message) which is sent by the service network to the UE.

In one embodiment, the service network may be a 5G NR network, and the measurement configuration may be Synchronization Signal Block (SSB)-based RRM Measurement Timing Configuration (SMTC). The SMTC may include a measurement occasion (or called "measurement window") offset, a measurement occasion duration (or called "SMTC period"), and a measurement occasion periodicity.

The DRX configuration may include information for configuring a DRX ON duration and a DRX cycle. The detailed description of the information included in the DRX configuration is omitted herein since it is beyond the scope of the application, and reference may be made to the 3GPP Technical Specification (TS) 38.331, release 15. Please note that the 3GPP specification mentioned herein is used to teach the spirit of the application, and the application should not be limited thereto.

Next, the UE determines whether the measurement configuration and the DRX configuration are aligned in time (step S320).

Figure 4B:
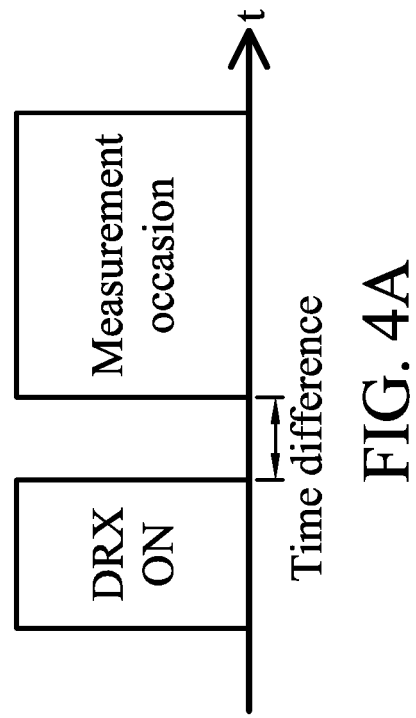
FIG. 4B is schematic diagram illustrating the time difference between a measurement occasion and a DRX ON occasion subsequent to the measurement occasion.
Figure 4A:
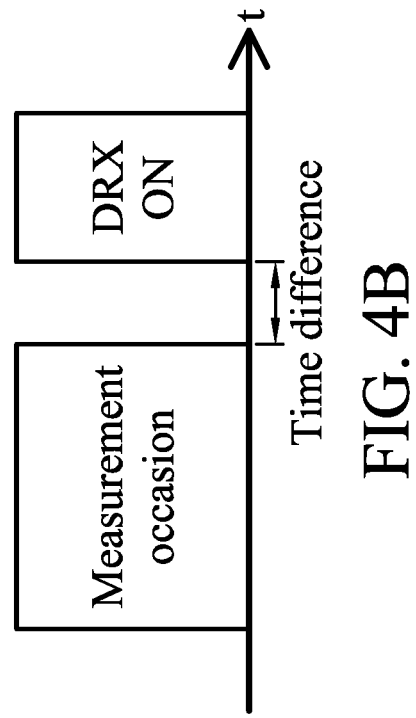
FIG. 4A is schematic diagram illustrating the time difference between a measurement occasion and a DRX ON occasion prior to the measurement occasion.

In one embodiment, the UE may determine a time difference between the start of a measurement occasion and the end of a DRX ON occasion prior to the measurement occasion (as shown in FIG. 4A), or between the end of the measurement occasion and the start of a DRX ON occasion subsequent to the measurement occasion (as shown in FIG. 4B) according to the measurement configuration and the DRX configuration. If the time difference is greater than a predetermined threshold (e.g., one time slot in a 5G NR network), the measurement configuration and the DRX configuration are determined to be not aligned in time. Otherwise, if the time difference is less than or equal to the predetermined threshold, the measurement configuration and the DRX configuration are determined to be aligned in time. Alternatively, if the time difference is less than or equal to the predetermined threshold, the UE may repeat the same check on one or several upcoming measurement occasions and DRX ON occasions, and if each of the results of all these checks shows that the time difference is less than or equal to the predetermined threshold, the measurement configuration and the DRX configuration are determined to be aligned in time.

In another embodiment, the predetermined threshold may be set to zero, causing the measurement configuration and the DRX configuration to be always determined as not aligned in time (i.e., the method flow always takes the 'No' branch of step S320).

Subsequent to step S320, if the measurement configuration and the DRX configuration are not aligned in time, the UE extends the measurement period indicated by the measurement configuration (step S330), and performs a cell measurement via the wireless transceiver in the extended measurement period (step S340), and the method ends.

In one embodiment, the service network may be a 5G NR network, and the cell measurements may be configured via the SMTC received from the 5G NR network to measure the signal quality (e.g, Reference Signal Receiving Power (RSRP), Received Signal Strength Indicator (RSSI), Reference Signal Received Quality (RSRQ), or Signal to Interference Noise Ratio (SINR)) of SSBs broadcasted by the cells of the 5G NR network.

The cell measurement may refer to an intra-frequency measurement (i.e., measurement on one or more intra-frequency cells), and/or an inter-frequency measurement (i.e., measurement on one or more inter-frequency cells) in a 5G NR network. Specifically, the cell measurement may include obtaining measurement results and reporting the measurement results to the service network.

In one embodiment, the extended measurement period may be linearly scaled from the measurement period. For example, let N*max(SMTC period, DRX cycle) be the measurement period and M*max(SMTC period, DRX cycle) be the extended measurement period, then M may equal to 1.5*N when DRX is in use with DRX cycle less than or equal to 320 milliseconds (ms), wherein N may refer to the number of required measurement samples.

In another embodiment, the extended measurement period may be the sum of the measurement period and an integer (i.e., M=N+x, where x is an integer).

It should be noted that, by extending the measurement period, the wireless transceiver is allowed to skip one or more measurement occasions to save power consumption. That is, for those measurement occasions to be skipped, the wireless transceiver may stay in a low-power mode in which wireless transceiving operations are not required or performed.

In one embodiment, the UE may determine the measurement occasion(s) to be skipped, each of which has a first time difference between the start of the measurement occasion and the end of a DRX ON occasion prior to the measurement occasion, and a second time difference between the end of the measurement occasion and the start of a DRX ON occasion subsequent to the measurement occasion, wherein both the first time difference and the second time difference are greater than a predetermined threshold. Otherwise, if either one of the first time difference and the second time difference is less than or equal to the predetermined threshold, the measurement occasion may not be skipped.

Figure 5:
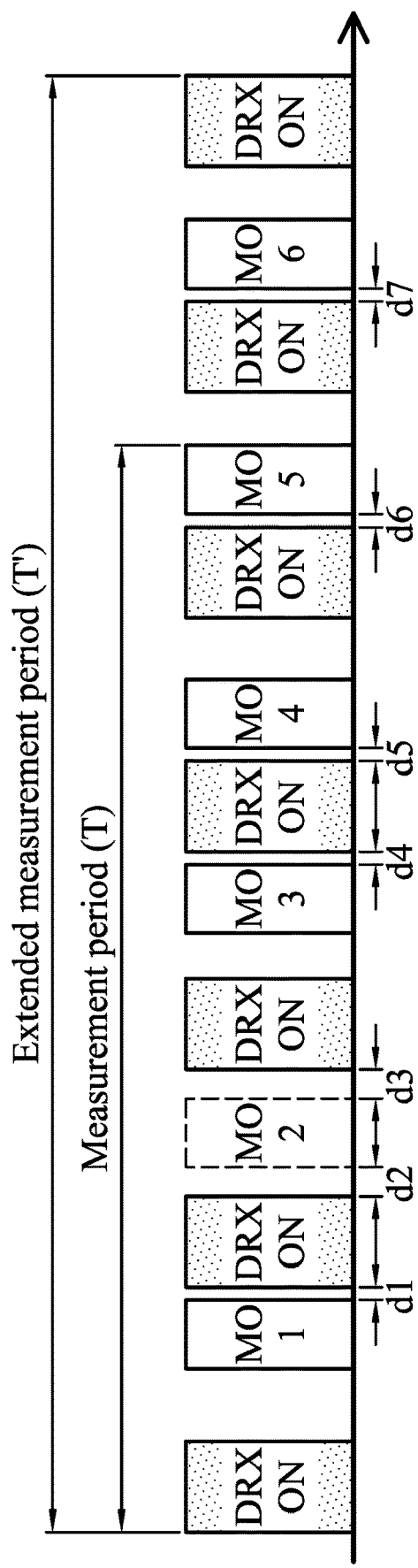
FIG. 5 is a schematic diagram illustrating the determination of the measurement occasion(s) (MO(s)) to be skipped in the extended measurement period according to an embodiment of the application.

FIG. 5 is a schematic diagram illustrating the determination of the measurement occasion(s) to be skipped in the extended measurement period according to an embodiment of the application.

As shown in FIG. 5, the measurement period may include 5 measurement occasions (denoted in MO-1 to MO-5), while the extended measurement period may include 6 measurement occasions (denoted in MO-1 to MO-6).

Conventionally, the UE is required to perform cell measurements in all the measurement occasions MO-1 to MO-5 within the measurement period. That is, the UE needs to collect 5 measurement samples out of the period T. By contrast, in the present application, the UE may collect 5 measurement samples out of the period T', and one of the measurement occasions MO-1 to MO-6 may be skipped to save power consumption.

In this embodiment, the measurement occasion MO-1 may not be skipped since one of the time difference to the previous DRX ON occasion and the time difference to the next DRX ON occasion (denoted as d1) is less than a predetermined threshold (e.g., one time slot in a 5G NR network). The measurement occasion MO-2 may be skipped since both the time difference to the previous DRX ON occasion (denoted as d2) and the time difference to the next DRX ON occasion (denoted as d3) are greater than the predetermined threshold. The measurement occasion MO-3 may not be skipped since one of the time difference to the previous DRX ON occasion and the time difference to the next DRX ON occasion (denoted as d4) is less than the predetermined threshold. The measurement occasion MO-4 may not be skipped since one of the time difference to the previous DRX ON occasion (denoted as d5) and the time difference to the next DRX ON occasion is less than the predetermined threshold. The measurement occasion MO-5 may not be skipped since one of the time difference to the previous DRX ON occasion (denoted as d6) and the time difference to the next DRX ON occasion is less than the predetermined threshold. The measurement occasion MO-6 may not be skipped since one of the time difference to the previous DRX ON occasion (denoted as d7) and the time difference to the next DRX ON occasion is less than the predetermined threshold.

Referring back to FIG. 3, subsequent to step S320, if the measurement configuration and the DRX configuration are aligned in time, the UE does not extend the measurement period indicated by the measurement configuration (step S350), and performs a cell measurement via the wireless transceiver in the measurement period (step S360), and the method ends.

In view of the forgoing embodiments, it will be appreciated that the present application proposes for the UE to extend the measurement period indicated by the measurement configuration (e.g., the SMTC) received from the service network. By extending the measurement period, the UE may be allowed to skip one or more measurement occasions during the extended measurement period, thereby allowing the wireless transceiver of the UE to stay in the low-power mode in the skipped measurement occasion(s). Advantageously, the UE's power consumption may be significantly reduced.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A User Equipment (UE), comprising:
  a wireless transceiver, configured to perform wireless transmission and reception to and from a service network; and
  a controller, configured to receive a measurement configuration and a Discontinuous Reception (DRX) configuration from the service network via the wireless transceiver, extend a measurement period based on the DRX configuration, and perform a cell measurement via the wireless transceiver in the extended measurement period;

wherein the measurement period is indicated by the measurement configuration, and the measurement configuration comprises a Synchronization Signal Block (SSB)-based Radio Resource Management (RRM) Measurement Timing Configuration (SMTC).

2. A method for performing a cell measurement, executed by a UE comprising a wireless transceiver, comprising:

receiving a measurement configuration and a Discontinuous Reception (DRX) configuration from a service network via the wireless transceiver;

extending a measurement period based on the DRX configuration; and performing the cell measurement via the wireless transceiver in the extended measurement period;

wherein the measurement period is indicated by the measurement configuration, and the measurement configuration comprises a Synchronization Signal Block (SSB)-based Radio Resource Management (RRM) Measurement Timing Configuration (SMTC).

3. The UE of claim 1, wherein the extending of the measurement period based on the DRX configuration comprises extending the measurement period based on DRX being in use as indicated by the DRX configuration.

4. The UE of claim 1, wherein the extending of the measurement period based on the DRX configuration comprises extending the measurement period based on a DRX cycle indicated by the DRX configuration.

5. The UE of claim 4, wherein the extending of the measurement period based on the DRX cycle comprises extending the measurement period based on whether the DRX cycle is less than 320 milliseconds.

6. The UE of claim 4, wherein the extending of the measurement period based on the DRX cycle comprises extending the measurement period based on the DRX cycle being less than 320 milliseconds.

7. The UE of claim 1, wherein the extending of the measurement period based on the DRX configuration comprises extending the measurement period in response to DRX being in use and a DRX cycle being less than 320 milliseconds as indicated by the DRX configuration.

8. The method of claim 2, wherein the extending of the measurement period based on the DRX configuration comprises extending the measurement period based on DRX being in use as indicated by the DRX configuration.

9. The method of claim 2, wherein the extending of the measurement period based on the DRX configuration comprises extending the measurement period based on a DRX cycle indicated by the DRX configuration.

10. The method of claim 9, wherein the extending of the measurement period based on the DRX cycle comprises extending the measurement period based on whether the DRX cycle is less than 320 milliseconds.

11. The method of claim 9, wherein the extending of the measurement period based on the DRX cycle comprises extending the measurement period based on the DRX cycle being less than 320 milliseconds.

12. The method of claim 2, wherein the extending of the measurement period based on the DRX configuration comprises extending the measurement period in response to DRX being in use and a DRX cycle being less than 320 milliseconds as indicated by the DRX configuration.

* * * * *